(12) United States Patent
Vatev et al.

(10) Patent No.: US 10,929,208 B1
(45) Date of Patent: Feb. 23, 2021

(54) METHODS AND APPARATUS FOR COPYING A SELECTED BROWSER REGION TO A CLIPBOARD AS AN IMAGE

(71) Applicant: Accusoft Corporation, Tampa, FL (US)

(72) Inventors: Kiril Vatev, New York, NY (US); Cody Owens, Tampa, FL (US); Stephen Brooks, Sparta, NC (US); Eric Goebel, Kenneth City, FL (US); Adam Cooper, Seffner, FL (US); Tim Kannapel, Tampa, FL (US)

(73) Assignee: Accusoft Corporation, Tampa, FL (US)

( * ) Notice: Subject to any disclaimer, the term of this patent is extended or adjusted under 35 U.S.C. 154(b) by 0 days.

(21) Appl. No.: 15/984,295

(22) Filed: May 18, 2018

Related U.S. Application Data

(60) Provisional application No. 62/669,372, filed on May 9, 2018.

(51) Int. Cl.

| | |
|---|---|
| *G06F 9/54* | (2006.01) |
| *G06F 3/0484* | (2013.01) |
| *G06F 16/958* | (2019.01) |
| *G06F 40/14* | (2020.01) |
| *G06F 40/134* | (2020.01) |
| *G06F 40/166* | (2020.01) |

(52) U.S. Cl.
CPC .......... *G06F 9/543* (2013.01); *G06F 3/04845* (2013.01); *G06F 16/986* (2019.01); *G06F 40/134* (2020.01); *G06F 40/14* (2020.01); *G06F 40/166* (2020.01)

(58) Field of Classification Search
CPC .... G06F 9/543; G06F 16/986; G06F 3/04845; G06F 17/2235
See application file for complete search history.

(56) References Cited

U.S. PATENT DOCUMENTS

| | | | |
|---|---|---|---|
| 7,870,501 B2* | 1/2011 | Iwema | G06F 3/0481 715/767 |
| 2008/0184138 A1* | 7/2008 | Krzanowski | G06F 21/33 715/760 |
| 2012/0149304 A1* | 6/2012 | Baliga | H04M 1/7253 455/41.2 |

OTHER PUBLICATIONS w3schools.com, "HTML <img> src Attrivute", Aug. 20, 2017, https://www.amazon.com/LEGO-Classic-Green-Baseplate-Supplement/dp/B00NHQF65S?tag=slicinc-20&ascsubtag=2be2835ee69d11e9830d2ecfd3424a6c0INT (Year: 2017).*

(Continued)

*Primary Examiner* — Michelle L Sams
(74) *Attorney, Agent, or Firm* — Straub & Straub; Michael P. Straub; Stephen T. Straub

(57) ABSTRACT

Methods and apparatus for extracting information corresponding to a user selected area of a displayed web page are described. A user selected region, e.g., rectangular region, of a displayed web page is identified based on received user input. The elements beneath the user selected region are converted to a raster data URL. An HTML5 image element is created with an src attribute set to the raster data URL and with a low image element opacity property. The created HTML5 image element is added to the web page as an overlay. The web browser's built-in copying functionality can now be used to copy the overlying image element to the clipboard as an image as desired, e.g., using a context menu which enables image MIME type data to be placed on the clipboard.

19 Claims, 12 Drawing Sheets

(56) References Cited

OTHER PUBLICATIONS w3schools.com, "CSS clip property", May 18, 2017, https://web.archive.org/web/20170518132245/https://www.w3schools.com/cssref/pr_pos_clip.asp (Year: 2017).*

Marshall, Carrie, "HTML5: what is it?", Sep. 28, 2017, https://www.techradar.com/news/internet/web/htm5-what-is-it-1047393 (Year: 2017).*

CauseMapping, "Using the Select Objects Arrow Cursor", Jun. 6, 2014, https://www.youtube.com/watch?v=XC5vJ-w3Muk (Year: 2014).*

* cited by examiner

METHODS AND APPARATUS FOR COPYING A SELECTED BROWSER REGION TO A CLIPBOARD AS AN IMAGE

RELATED APPLICATIONS

The present application claims the benefit of U.S. Provisional Patent Application Ser. No. 62/669,372 filed May 9, 2018 which is hereby expressly incorporated by reference in its entirety.

FIELD

Various embodiments are directed to methods and apparatus for extracting information from a web page, and more, particularly to method and apparatus for copying a selected region of a displayed web page to a clipboard.

BACKGROUND

Major web browsers, e.g., Internet Explorer, Google Chrome, Apple Safari, Firefox, etc., enforce strict security measures to protect users from malicious code. Access to the system clipboard is constrained such that Javascript may only insert data in the form of text. A user may insert data of other types into the clipboard for example by using the context menu, such as when copying an image to the clipboard, as the context menu does not have the same Javascript API restriction. An <image> element occurring on a portion of a displayed web page can be copied using the context menu to a system clipboard; however, other non-image element portions of a web page cannot be readily copied to the system clipboard. It would be desirable if a user could select any desired region of a web page and copy it to a clipboard, e.g., for use in another application. Based on the above discussion there is a need for new methods and apparatus that facilitate extraction of information from web pages displayed via a browser with clipboard security constraints.

SUMMARY

Various embodiments are directed to novel method and apparatus whereby it is seamless for a user of a web browser, e.g., an HTML5 compliant web browser, to select an area, e.g., an arbitrary rectangular area, on a given web page and place it on the clipboard with a binary Multipurpose Internet Mail Extensions (MIME) type suitable for an image.

A user selected region, e.g., rectangular region, of a displayed web page is identified based on received user input. The elements beneath the user selected region are converted to a raster data URL. An HTML5 image element is created with an src attribute set to the raster data URL, with position property of absolute or with another property or value set to prevent interaction with existing web page elements, with the same dimensions and coordinates as the user selected region, with a low image element opacity property, and with the image element Z-index to ensure the created element will be on top. The created HTML5 image element is added to the web page as an overlay. The newly created HTML5 image element is effectively a duplicate of the elements in the selected region, but in a format to overcome the web browser security restrictions and allow copying to a clipboard. The newly created image element is pre-selected for end user use, e.g., using the HTML5 Selection and Range APIs in the web browser. To the user, the user selected region of the initially displayed web page will appear to have been selected, but in fact it is the newly generated effectively transparent image overlay that is selected in the browser. The web browser's built-in copying functionality can now be used to copy the overlying image element to the clipboard as an image as desired, e.g., using a context menu which enables image MIME type data to be placed on the clipboard.

An exemplary method of operating a computer system to copy content, in accordance with some embodiments, comprises: determining from user input, a user selected area of a displayed web page; creating an image element corresponding to the position of the user selected area; updating the displayed web page image to include the image element as a transparent overlay; signaling to a web browser controlling the display of said web page that the added image element has been selected by the user; and copying image element to a computer clipboard.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 1 comprises the combination of FIG. 1A, FIG. 1B and FIG. 1C.

DETAILED DESCRIPTION

Figure 1A:
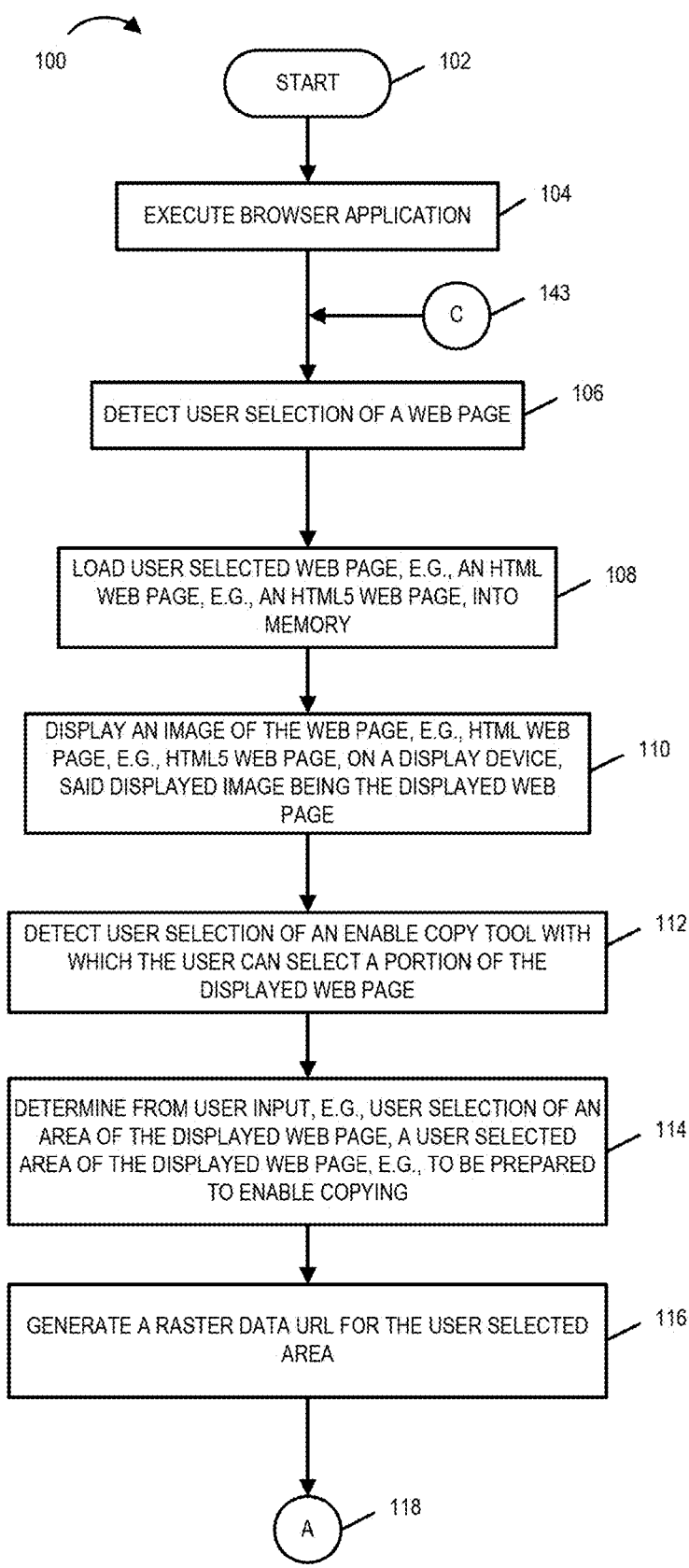
FIG. 1A is a first part of a flowchart of an exemplary method of operating a computer system to copy content in accordance with an exemplary embodiment.
Figure 1B:
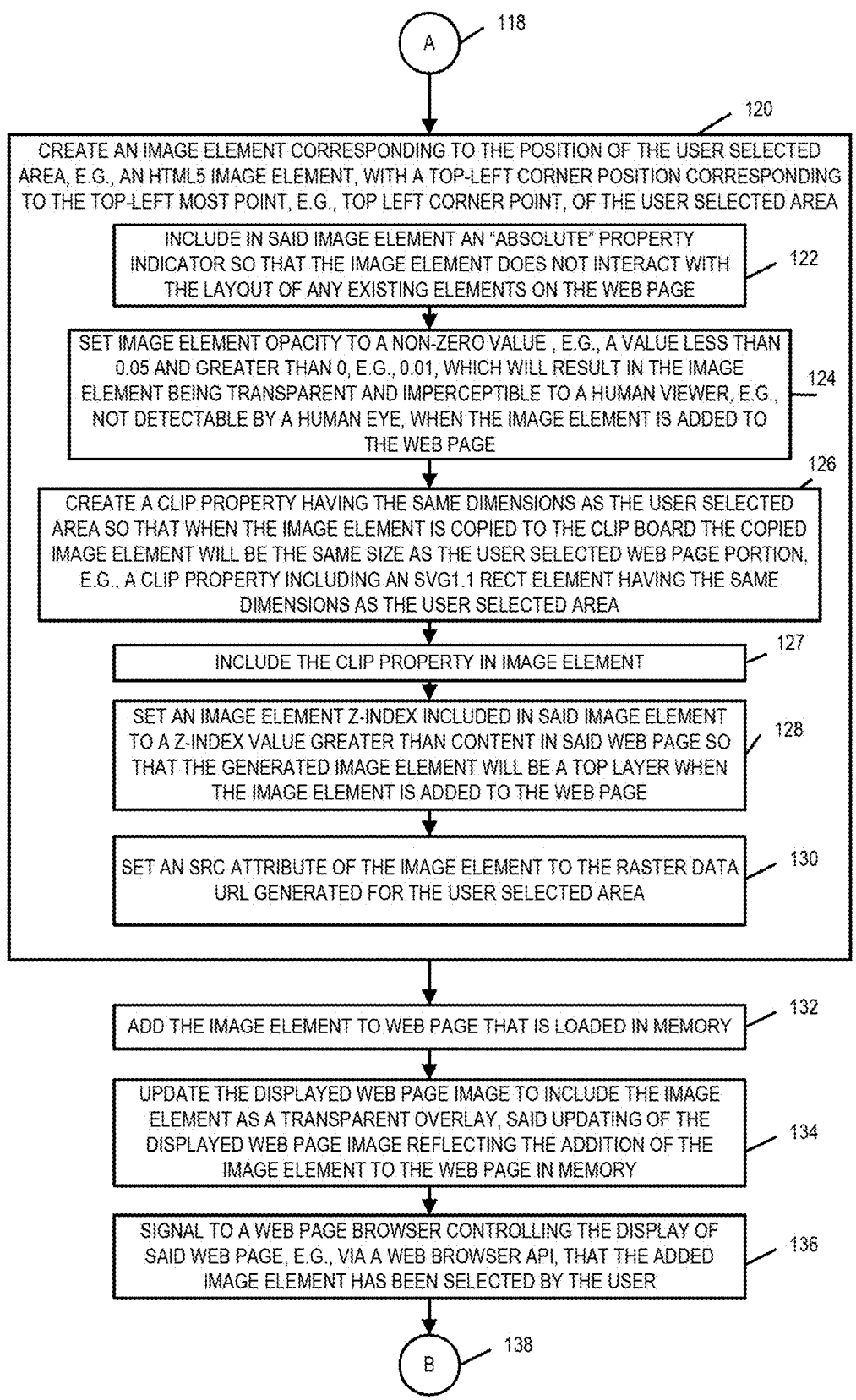
FIG. 1B is a second part of a flowchart of an exemplary method of operating a computer system to copy content in accordance with an exemplary embodiment.
Figure 1C:
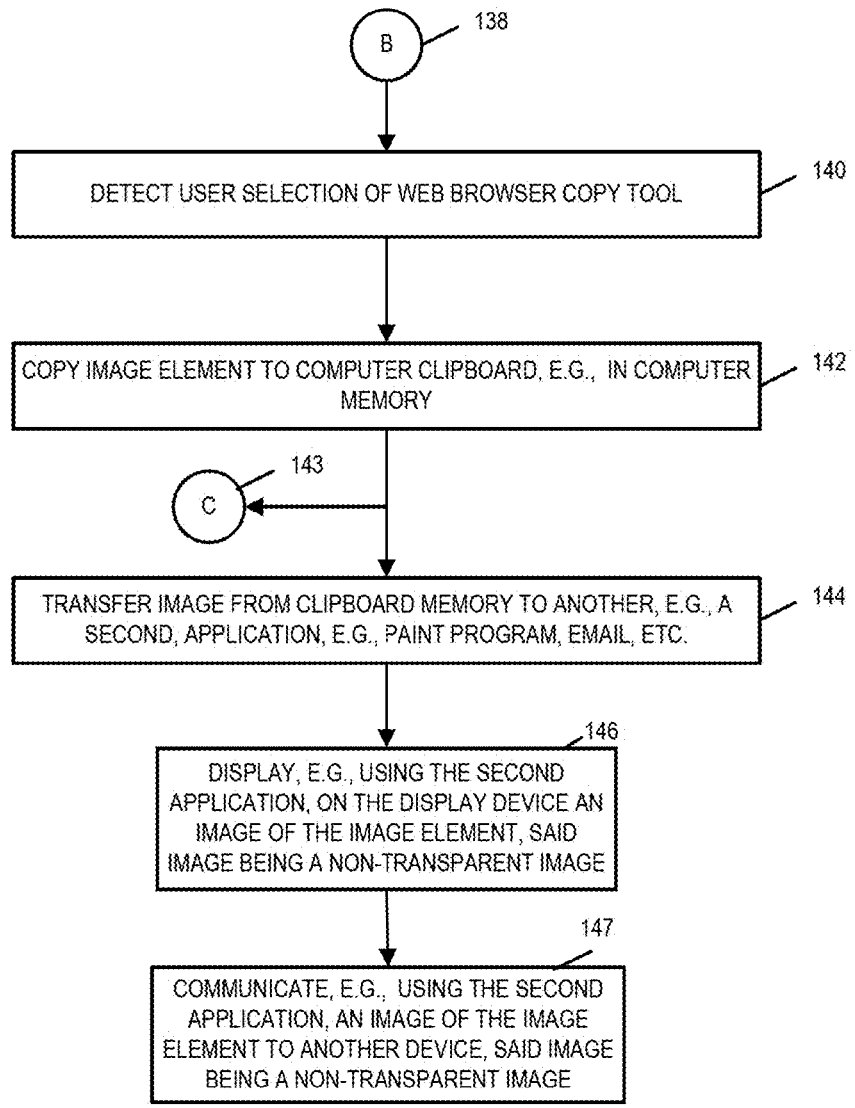
FIG. 1C is a third part of a flowchart of an exemplary method of operating a computer system to copy content in accordance with an exemplary embodiment.

FIG. 1, comprising the combination of FIG. 1A, FIG. 1B and FIG. 1C, is a flowchart 100 of an exemplary method of operating a computer system, e.g., a computer device, to copy content, in accordance with an exemplary embodiment. The computer system implementing the method of flowchart 100 is, e.g., computer system 200 of FIG. 2, computer system 1 802 of FIG. 8, computer system 2 804 of FIG. 8, or computer system N 806 of FIG. 8. Operation of the exemplary method starts in step 102 in which the computer system is powered on and initialized. Operation proceeds from step 102 to step 104.

In step 104 the computer system executes a browser application. Operation proceeds from step 104 to step 106. In step 106 the computer system detects user selection of a web page. Operation proceeds from step 106 to step 108.

In step 108 the computer system loads the user selected web page, e.g., an HTML web page, e.g., an HTML5 page, into memory. Operation proceeds from step 108 to step 110.

In step 110 the computer system displays an image of the web page, e.g., HTML web page, e.g., HTML5 web page, on a display device, said displayed image being the displayed web page. Operation proceeds from step 110 to step 112.

In step 112 the computer system detects user selection of an enable copy tool with which the user can select a portion of the displayed web page. Operation proceeds from step 112 to step 114.

In step 114 the computer system determines from user input, e.g., user selection of an area of the displayed web page, an area of the displayed web page, e.g. an area of the displayed web page to be prepared to enable copying. Operation proceeds from step 114 to step 116.

In step 116 the computer system generates a raster data URL for the user selected area. Operation proceeds from step 116, via connecting node A 118, to step 120. In step 120 the computer system creates an image element corresponding to the position of the user selected area, e.g., an HTML5 image element, with a top-left corner position corresponding to the top-left most point, e.g., top left corner point, of the user selected area. Step 120 includes steps 122, 124, 126, 127, 128, and 130.

In step 122 the computer system includes in said image element an "absolute" property indicator so the image element does not interact with the layout of any existing elements on the web page. Setting of the Absolute property is exemplary and other approaches can be and sometimes are used to prevent interaction with existing web page elements of a web page into which the generated image element may be inserted. The 'ABSOLUTE' property is one of many possible ways to ensure that a newly inserted element on a web page does not affect the layout of other elements already on the web page. Adding the element in a way to not interact with other pre-existing elements is achieved by the addition of such a value or another value or property. Use of the 'ABSOLUTE' property is not critical or necessary in all embodiments. The property or value ensures that the inserted image element will not affect the layout of other components on the page including the selected portion beneath the inserted image element.

Operation proceeds from step 122 to step 124. In step 124 the computer system sets image element opacity to a low non-zero value, e.g., a value less than 0.05 and greater than 0, e.g., 0.01, which will result in the image element being transparent and imperceptible to a human viewer, e.g., not detectable by a human eye, when the image element is added to the web page. Operation proceeds from step 124 to step 126, in which the computer system creates a clip property having the same dimensions as the user selected area so that when the image element is copied to the clipboard the copied image will be the same size as the user selected web page portion, e.g., a clip property including an SVG1.1 RECT element having the same dimensions as the user selected area. In some embodiments, creating a clip property includes generating an SVG1.1 RECT element having the same dimensions as the user selected area of the web page portion. Operation proceeds from step 126 to step 127. In step 127 the computer system includes the clip property in the image element. Operation proceeds from step 127 to step 128. In step 128 the computer system sets image element Z-index included in said image element to a Z index value greater than content in said web page so that the generated image element will be a top layer when the image element is added to the web page. Operation proceeds from step 128 to step 130, in which the computer system sets an SRC attribute of the image element to the raster data URL generated for the user selected area.

Operation proceeds from step 120 to step 132. In step 132 the computer system adds the image element to the web page that is located in memory. Operation proceeds from step 132 to step 134. In step 134 the computer system updates the displayed web page image to include the image element as a transparent overlay, said updating of the displayed web page image reflecting the addition of the image element to the web page in memory. Operation proceeds from step 134 to step 136. In step 136 the computer system signals to the web page browser controlling the display of said page, e.g., via a web browser API, that the added image element has been selected by the user. In some embodiments, said step of signaling to a web browser controlling the display of said web page that the added image element has been selected by the user is performed automatically by a processor of the computer system without further user input after the user provides the input used to indicate the selected web page area following detection of selection of an enable copy tool by the user. For example, once the user enables the copy function by selection of the enable copy tool by clicking on a copy tool icon, the user can select the area to be copied using a mouse click combined with mouse movement to indicate the user selected area or by using a touch screen input to indicate the user selected area to be copied. Operation proceeds from step 136, via connecting node B 138, to step 140.

In step 140, the computer system detects user selection of a web browser copy tool. Operation proceeds from step 140 to step 142. In step 142 the computer system copies the image element to a computer clipboard, e.g. in computer memory. Operation proceeds from step 142, via connecting node C 143 to step 106. Operation also proceeds from step 142 to step 144.

In step 144 the computer system transfers the image from the clipboard memory to another, e.g., a second, application, e.g., a paint program, e-mail, etc. Operation proceeds from step 144 to step 146. In step 146, the computer system displays, e.g., using the second application, on the display device an image of the image element, said image being a non-transparent image. Operation proceeds from step 146 to step 147. In step 147 the computer system communicates, e.g., using the second application, an image of the image element to another device, said image of the image element being a non-transparent image.

In some embodiments, a processor in the computer system, e.g., processor 224 of computer system 200 is operated to perform the steps of flowchart 100 of FIG. 1 and implement the method of flowchart 100 of FIG. 1 and/or to control the computer system 200 to implement the method.

Figure 2:
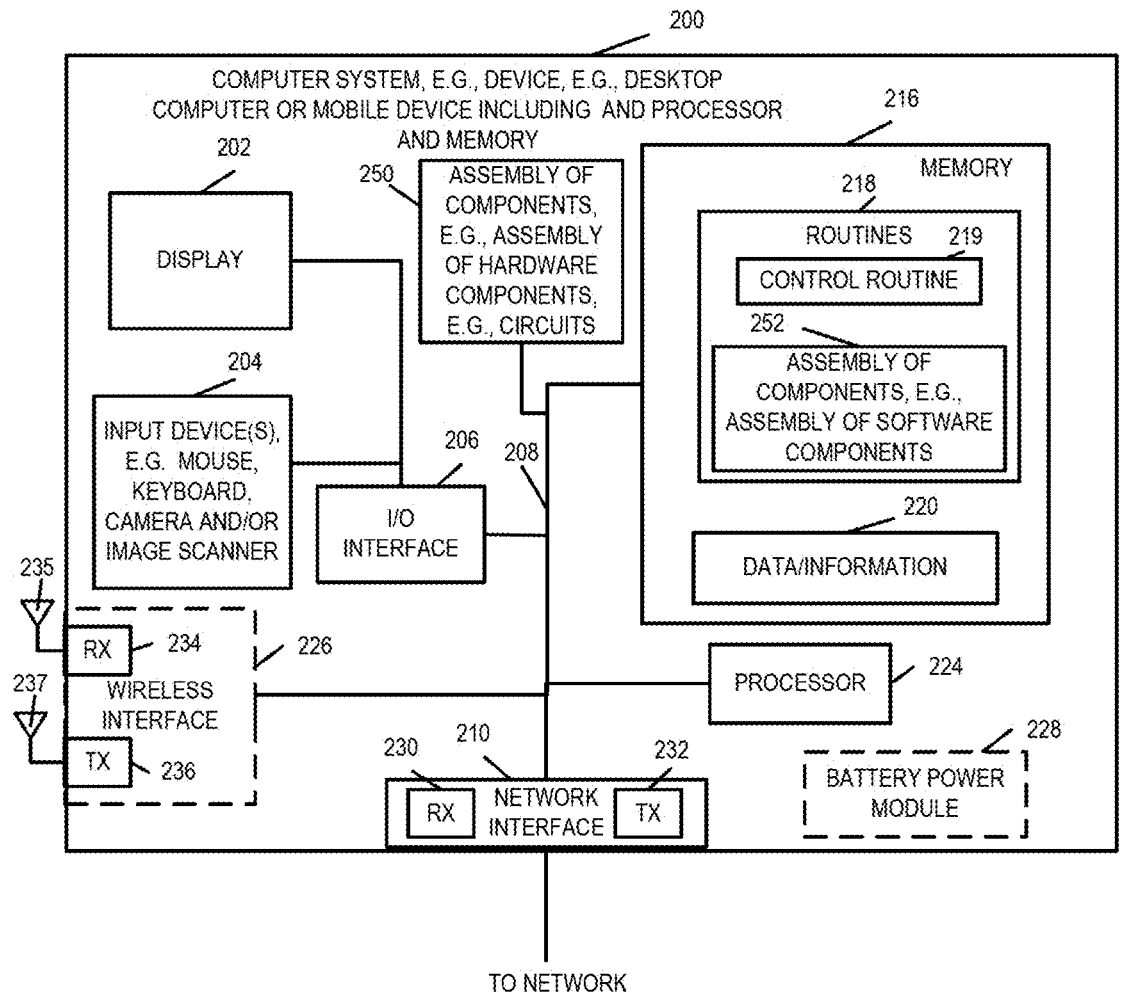
FIG. 2 illustrates an exemplary system, e.g., computer device, e.g., a desktop personal computer or a mobile device including processing capability and a memory implemented in accordance with an exemplary embodiment, which may implement the method of the flowchart of FIG. 1.

FIG. 2 illustrates an exemplary device 200, e.g., a desktop personal computer or a mobile device including processing capability and a memory implemented in accordance with an exemplary embodiment. The device 200 can be and sometimes is used to implement the steps of the various methods and/or routines shown in the various flowcharts included in the present application. The exemplary device 200 includes a display 202, input device(s) 204, memory 216, processor 224, e.g., a CPU, I/O interface 206, assembly of components 250, e.g., an assembly of hardware components, e.g., circuits, and network interface 210. In some embodiments, device 200 also includes a wireless interface 226 for supporting wireless communications and a battery power module 228 for operating the device 200 on battery power. Network interface 210 includes a receiver 230 and a transmitter 232. Wireless interface 226 includes a wireless receiver 234 coupled to receive antenna 235 and a wireless transmitter 236 coupled to a transmit antenna 237.

Input device(s) 204 includes, e.g. a mouse, keyboard, keypad, touch screen, scanner, camera, and/or other user input devices. The display 202 and input devices 204 are coupled to a bus 208 by I/O interface 206. The bus 208 is also coupled to the memory 216, processor 224, assembly of hardware components 250, and network interface 210. The network interface 210 couples the internal components of the device 200 to an external network, e.g., the Internet, thereby allowing the device 200 to receive and send data over a network. Alternatively, or in addition, wireless interface 226 which includes a wireless transmitter 236 and a wireless receiver 234, couples device 200 to other wireless devices and/or a wireless communications network and/or the Internet.

Memory 216 includes routines 218 and data/information 220. Routines 218 include a control routine 219 and an assembly of components 252, e.g., an assembly of software components. In some embodiments, the control routine 219 causes the device 200 to implement the steps of the methods of flowcharts of FIG. 1. Processor 224 controls operation of the device 200 under the directions of components, e.g., software components, and/or routines, e.g., control routine 219, stored in memory 216. In various embodiments, processor 224 is configured to implement the methods shown in the flowchart of FIG. 1.

Figure 3A:
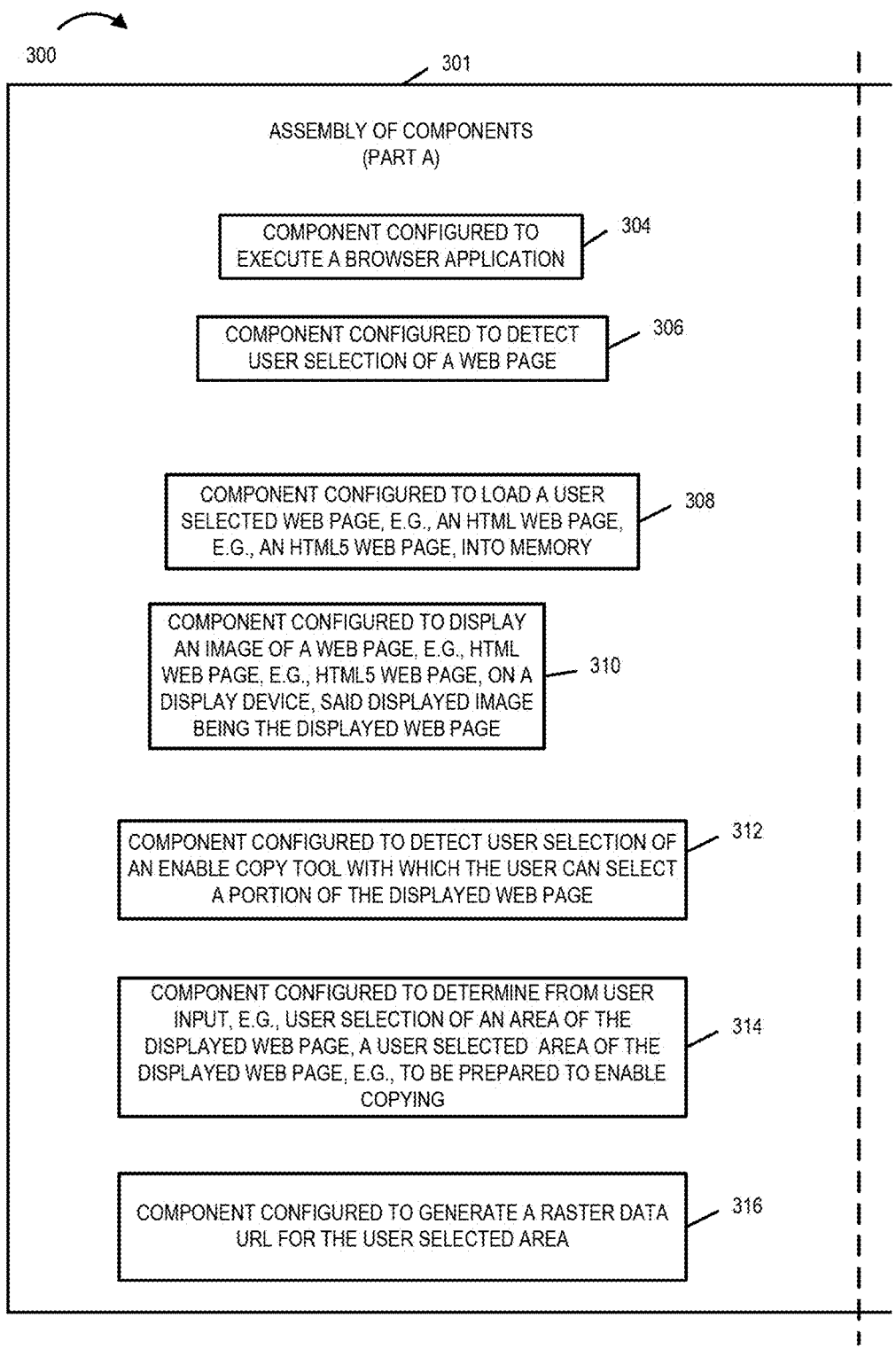
FIG. 3A is a first part of an assembly of components which may be included in the computer system, e.g., computer device, of FIG. 2, in accordance with an exemplary embodiment.
Figures 3, 3B:
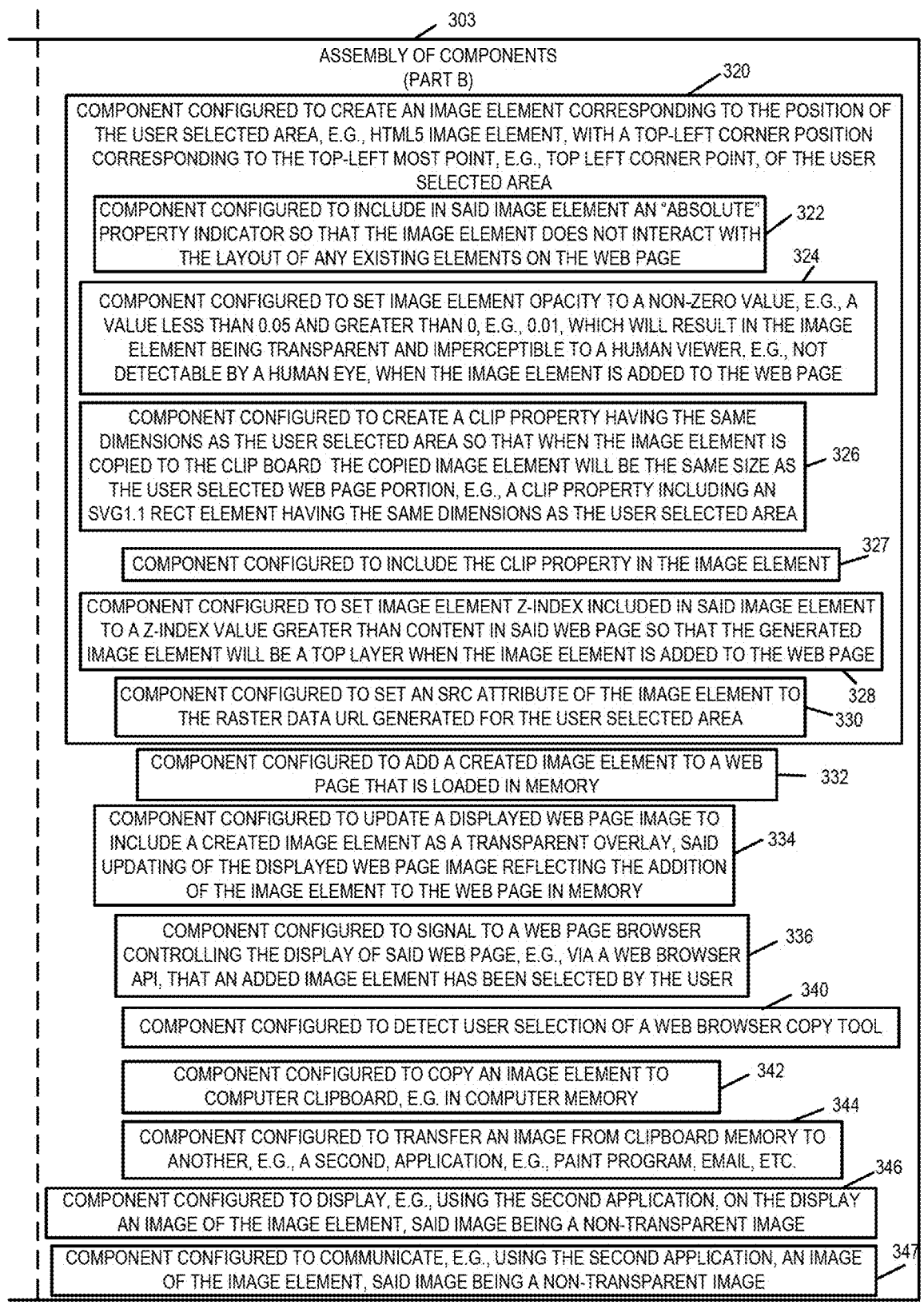
FIG. 3B is a second part of an assembly of components which may be included in the computer system, e.g. computer device, of FIG. 2, in accordance with an exemplary embodiment.
FIG. 3 comprises the combination of FIG. 3A and FIG. 3B.

FIG. 3, comprising the combination of FIG. 3A and FIG. 3B, is a drawing of an assembly of components 300 comprising the combination of Part A 301 and Part B 303, in accordance with an exemplary embodiment.

The exemplary assembly of components 300 may be included in an exemplary computer system 200, e.g., a computer device, of FIG. 2 in accordance with an exemplary embodiment. The components in the assembly of components 300 can, and in some embodiments are, implemented fully in hardware within the processor 224, e.g., as individual circuits. The components in the assembly of components 300 can, and in some embodiments are, implemented fully in hardware within the assembly of components 250, e.g., as individual circuits corresponding to the different components. In other embodiments some of the components are implemented, e.g., as circuits, within the processor 224 with other components being implemented, e.g., as circuits within assembly of components 250, external to and coupled to the processor 224. As should be appreciated the level of integration of components on the processor and/or with some components being external to the processor may be one of design choice. Alternatively, rather than being implemented as circuits, all or some of the components may be implemented in software and stored in the memory 216 of the computer system 200, with the components controlling operation of system 200 to implement the functions corresponding to the components when the components are executed by a processor, e.g., processor 224. In some such embodiments, the assembly of components 300 is included in the memory 216 as assembly of components 252. In still other embodiments, various components in assembly of components 300 are implemented as a combination of hardware and software, e.g., with another circuit external to the processor 224 providing input to the processor 224 which then under software control operates to perform a portion of a component's function. While processor 224 is shown in the FIG. 2 embodiment as a single processor, e.g., computer, it should be appreciated that the processor 224 may be implemented as one or more processors, e.g., computers.

When implemented in software the components include code, which when executed by the processor 224, configure the processor 224 to implement the function corresponding to the component. In embodiments where the assembly of components 300 is stored in the memory 216, the memory 216 is a computer program product comprising a computer readable medium comprising code, e.g., individual code for each component, for causing at least one computer, e.g., processor 224, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 3 control and/or configure the computer system 200, e.g., a computer device, or elements therein such as the processor 224, to perform the functions of corresponding steps illustrated and/or described in the method of one or more of the flowcharts, signaling diagrams and/or described with respect to any of the Figures. Thus the assembly of components 300 includes various components that perform functions of corresponding one or more described and/or illustrated steps of an exemplary method, e.g., steps of an exemplary method of flowchart 100 of FIG. 1.

Assembly of components 300 includes a component 304 configured to execute a browser application, a component 306 configured to detect user selection of a web page, a component 308 configured to load a user selected web page, e.g., user selected an HTML web page e.g., an user selected HTML5 web page, into memory, a component 310 configured to display an image of a web page, e.g., an HTML web page, e.g. an HTML5 web page, on a display device, said displayed image being the displayed web page, a component 312 configured to deter user selection of an enable copy tool with which the user can select a portion of the displayed web page, a component 314 configured to determine from user input, e.g. user selection of an area of a display web page, an user selected area of the displayed web page, e.g., a user selected area of the displayed web page to be prepared to enable copying, and a component 316 configured to generate a raster data URL for the user selected area.

Assembly of components 300 further includes a component 320 configured to create an image element corresponding to the position of the user selected area, e.g. an HTML5 image element, with a top-left corner position corresponding to the top-left most point, e.g., top left corner point, of the user selected area. Component 320 configured to create an image element includes a component 322 configured to include in said image element an "absolute" property indicator so the image element does not interact with the layout of any existing elements on the web page, a component 324 configured to set an image element opacity to a non-zero value, e.g., a value less than 0.05 and greater than 0, e.g., 0.01, which will result in the image element being transparent and imperceptible to a human viewer, e.g., not detectable by a human eye, when the image element is added to the web page, a component 326 configured to create a clip property having the same dimensions as the use selected area so that when the image element is copied to the clipboard the copied image element will be the same size as the user selected web page portion, e.g., a clip property including an SVG1.1 RECT element have the same dimension as the user selected area, a component 327 configured to included the clip property in the image element, a component 328 configured to set image element Z-index included in said image element to a Z index value greater than that of content in said web page so that the generated image element will be a top layer when the image element is added to the web page, and a component 330 configured to set an SRC attribute of the image element to the raster data URL generated for the user selected area.

Assembly of components 300 further includes a component 332 configured to add a created image element to a web page that is loaded in memory, a component 334 configured to update a displayed web page image to include a created image element as a transparency overlay, said updating of the displayed web page reflecting the addition of the image element to the web page in memory, a component 336 configured to signal to a web page browser controlling display of said web page, e.g., via a web browser API, that an added image has been selected by the user, a component 340 configured to detect user selection of a web browser copy tool, a component 342 configured to copy an image element to a computer clipboard, e.g., in computer memory, a component 344 configured to transfer an image from clipboard memory to another, e.g., a second application, e.g., a paint program, EMAIL, etc., a component 346 configured to display, e.g., using the second application, on the display device an image of the image element, said image being a non-transparent image, and a component 346 configured to communicate, e.g., using the second application, an image of the image element to another device, said image being a non-transparent image.

In some embodiments, component 336, which is configured to signal to a web browser controlling the display of said web page that the added image element has been selected by the user, is configured to signal automatically without further user input after the user provides the input used to indicate the selected web page area following detection of selection of an enable copy tool by the user. For example, once the user enables the copy function by selection of enable copy tool by clicking on a copy tool icon, the user can select the area to be copied, e.g., using a mouse click to activate a selection option combined with mouse movement to indicate the user selected area or by using a touch screen input to indicate the user selected area to be copied. Once the area selected to be copied is indicated, the copy to the clipboard is then automatic without requiring further user input. As part of the copy the displayed web page may be updated with a transparent version of the area selected to be copied.

Figure 4:
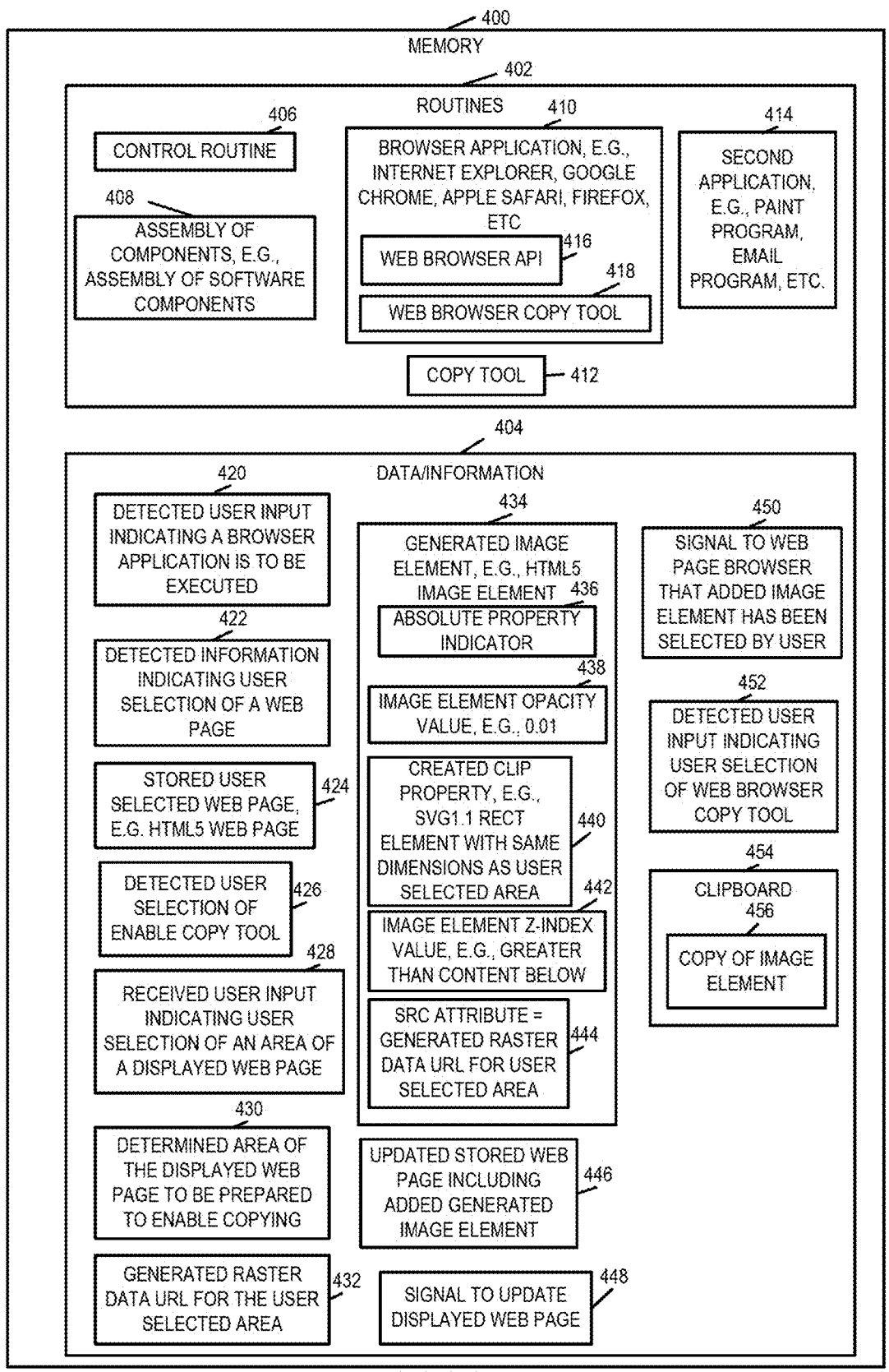
FIG. 4 is a drawing of exemplary memory, which may be included in the computer system, e.g., computer device, of FIG. 2, in accordance with an exemplary embodiment.

FIG. 4 is a drawing of exemplary memory 400 in accordance with an exemplary embodiment, which may be included in a computer system, e.g., a computer device, implementing an exemplary method in accordance with the present invention. Memory 400 of FIG. 4 is, e.g., memory 216 of computer system 200 of FIG. 2; routines 402 of FIG. 4 is, e.g., routines 218 of FIG. 2; control routine 406 of FIG. 4 is, e.g., control routine 219 of FIG. 2, assembly of components 408 of FIG. 4 is, e.g., assembly of components 254 of FIG. 2; and data/information 404 of FIG. 4 is, e.g., data/information 220 of FIG. 2.

Memory 400 includes routines 402 and data/information 404. Routines 402 includes a control routine 406, assembly of components 408, e.g., an assembly of software components, browser application 410, e.g., Internet Explorer, Google Chrome, Apple Safari, Firefox, etc., a copy tool 412, and a second application 414, e.g., a paint program, an E-mail program, etc. Browser application 410 includes a web browser API 416 and a web browser copy tool 418. In some embodiments, the copy tool 412 is included as part of an assembly of components, e.g., one or more or all of components in assembly of components 408.

Data/information 404 includes detected user input indicating a browser application is to be executed 420, detected information indicating user selection of a web page 422, a stored user selected web page 424, e.g., a HTML5 web page, detected user selection of enable copy tool 426, received user input indicating user selection of an area of a displayed web page 428, a determined area of the displayed web page to be prepared to enable copying 430, and a generated raster data URL for the user selected area 432.

Data/information 404 further includes a generated image element 434, e.g., a generated HTML5 image element, with a top-left corner position corresponding to the top-left most point, e.g., top left corner point, of the user selected area. Generated image element 434 includes an absolute property indicator 436 so that the image element does not interact with the layout of any other existing elements on the web page, an image element opacity value 438, which is a low non-zero value, e.g., 0.01, a created clip property 440, e.g., SVG1.1 RECT element with the same or substantially the same dimensions as the user selected area, a image element Z-index value 442, e.g., a Z-index value greater than of any content, which will be below the generated image element, when the image element is added to the web page, and an SRC attribute 444 which is equal to the generated raster data URL for the user selected area 432. Data/information 404 further includes an updated stored web page 448 including an added generated image element 446, e.g., stored user selected web page 424 plus the generated image element 434, a signal to update the displayed web page 448, a signal 450 to the web page browser 410, e.g., via web browser API 416, indicating that the added image element 434 has been selected by the user, detected user input 452 indicating user selection of the web browser copy tool 418, and a clipboard 454 including a copy 456 of the image element 434, which was added to the displayed web page. The copy 456 of the image element stored in the clipboard 454 may be, and sometimes is, used by a second application 414. An image of the image element stored on the computer clipboard 454 may be, and sometimes is, displayed, e.g., as part of using a second application, on a display device, e.g., display device 202 of computer system 200, said communicated image being a non-transparent image. An image of the image element stored on the computer clipboard may be, and sometimes is, communicated, as part of using a second application, to another device, e.g., E-mail server 814 of FIG. 8, or one of additional application servers (816, . . . 818) of FIG. 8, said communicated image being a non-transparent image.

Various aspects and/or features of some embodiments of the present invention are further discussed below. The user aims to select an arbitrary rectangular region within an HTML5 element currently visible web page and copy it into the clipboard using the context menu. It is desirable that the process be as seamless as possible. The selected region should behave like an HTML5<image> element.

Steps of an exemplary method, in accordance with an exemplary embodiment, are described below.

Step 1: The user selects rectangular region on the web page.

Step 2: The elements of the page beneath the selected rectangle region are converted to a raster data URL using publicly available techniques.

Step 3: An HTML5 image element is created whose top-left corner is positioned at the top-left most point of the user's selection rectangle.

Step 4: The image element receives a position property of 'absolute' such that it does not interact with the layout of any other existing elements on the page. This also enables the clip property in step 5.

Step 5: A clip property containing an SVG1.1 rect element of the same dimensions of the user-selected rectangular region is created for the image with the same coordinates as the user's rectangular selection to ensure that the image element does not extend beyond the selection rectangle if the rectangle selection's coordinate space were different (i.e. embedded in SVG) resulting in an image with a different size in the browser's default HTML5 coordinate space.

Step 6: The image element opacity property is set to 0.01. Since the opacity is not 0, the web browser will allow the user to interact with the element. However, it is effectively invisible to the end user.

Step 7: The image element z-index is set to be greater than that of the content below to ensure that it will be interactive to the end user and not buried under another element.

Step 8: The src attribute of the image element is set to the image data URL created in step 2.

Step 9: Using the existing HTML5 Selection and Range APIs, the newly created image element is pre-selected for the end-user. The user's selection rectangle will appear to have been selected, but in fact it is the newly generated effectively transparent image overlay that is selected in the browser.

Step 10: The user can now make use of the web browser's built-in copying functionality to copy the overlying image element to the clipboard as an image as desired. Typically, this is with the context menu as it enables image MIME type data to be placed on the clipboard.

Figure 5:
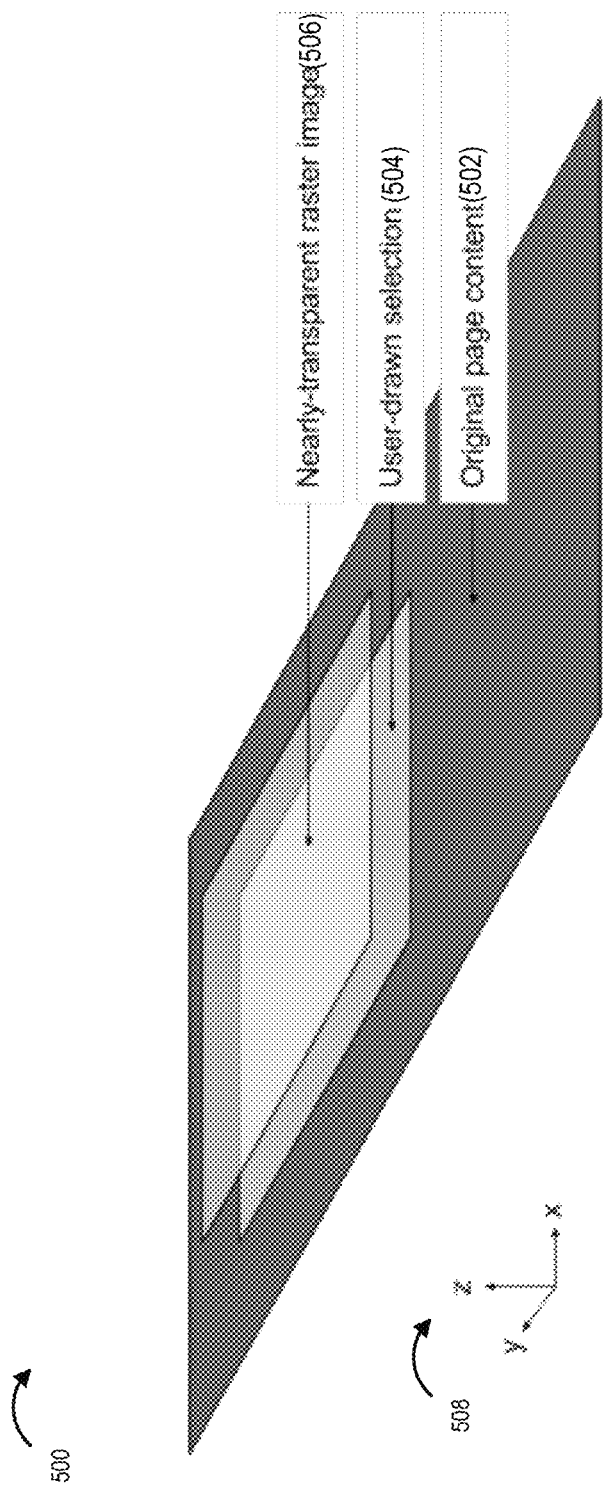
FIG. 5 includes diagram, which is a 3-dimensional representation of the user interaction, showing the original content, the user-selection, and the rasterized image, in accordance with an exemplary embodiment.

FIG. 5 includes diagram 500, which is a 3-dimensional representation of the user interaction, showing the original content 502, which is a bottom layer, at the bottom, the user-selection 504 (middle layer), drawn directly on top of the bottom layer, followed by the rasterized image 506, which is a translucent top layer, placed on the top of the stack in order to capture all future user interaction first, in accordance with an exemplary embodiment. FIG. 5 also includes reference frame 508, where X and Y are axis used for position locations on the web page and Z is used for vertical stacking, e.g., of elements.

Figure 6:
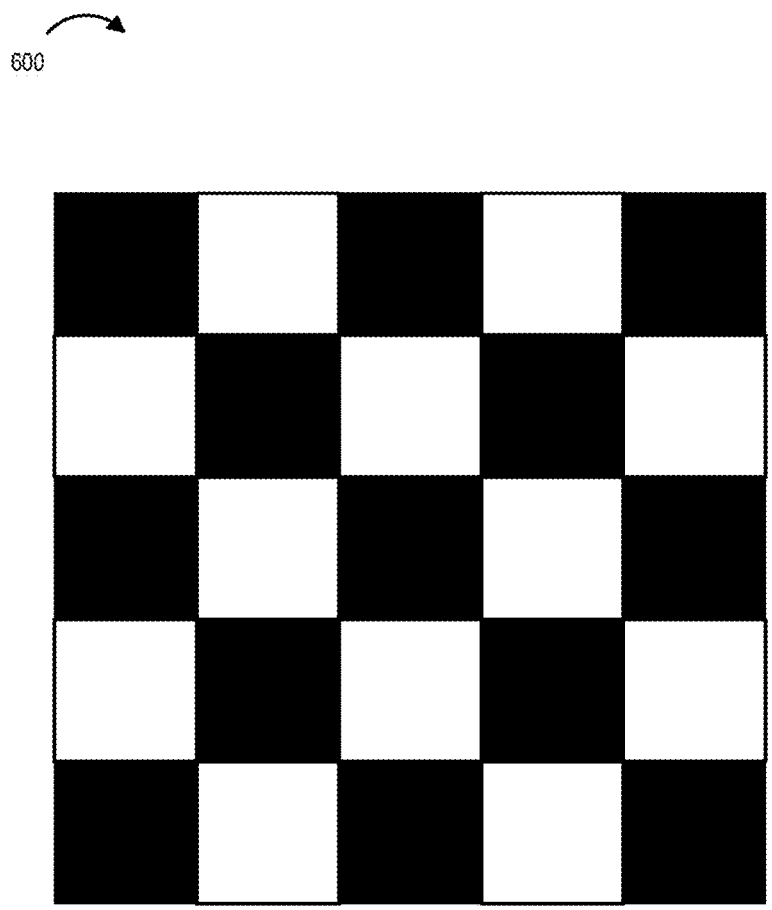
FIG. 6 is a drawing illustrating a user view of an initial screen display of a web page, e.g., an HTML5 web page, initially displayed on a computer web screen.

A copy selected area example, in accordance with an exemplary embodiment, is described below. FIG. 6 is a drawing 600 of a user view of an initial screen display of a web page, e.g., an HMTL5 web page, initially displayed on a computer web screen.

The following is exemplary HTML pseudo-code prior to selecting and copying.

```
<html lang="en">
<head>
    <meta charset="UTF-8">
    <title>Copy Area</title>
    <style>
        #pageContainer {
            position: relative;
            width: 1000px;
            margin: 0;
            padding: 0;
        }
        svg {
            margin: 0;
            padding: 0;
            width: 100%;
        }
        #image {
            position: absolute;
            opacity: 0.01;
        }
    </style>
</head>
<body>
    <div id='pageContainer' style="position:relative;">
        <svg version="1.1" viewBox="0 0 2000 2000"
xmlns="http://www.w3.org/2000/svg"
xmlns:xlink="http://www.w3.org/1999/xlink"
            height="1000px" width="1000px"
preserveAspectRatio="xMinYMin">
            <image height="2000px" width="2000px"
xlink:href="data:image/png;base64, {BASE64 ENCODED IMAGE DATA INCLUDED HERE}"
                preserveAspectRatio="xMinYMin"></image>
            <!-- just a visual to represent the selected area -->
            <rect x="0" y="0" width="0" height="0" fill="rgba(0, 0, 0, 0)"></rect>
        </svg>
        <img id="image" />
    </div>
    <script>
        var svg = document.querySelector('svg');
        var image = document.querySelector('#image');
        var selectionBox = document.querySelector('rect');
        var svgContent = svg.querySelector('image');
        var x1 = 0;
        var x2 = 0;
        var y1 = 0;
        var y2 = 0;
        var selectionMode = false;
        var svgContentRect = svgContent.getBoundingClientRect( );
        var tmp;
        // Calculate the difference in size between the SVG viewbox and the non-vector elements
        var svgWidthRatio = svgContentRect.width / svg.getAttribute('viewBox').split(' ')[2];
        var svgHeightRatio = svgContentRect.height / svg.getAttribute('viewBox').split(' ')[3];
        // Ensure that we cannot see the raster image, which will be very large.
        // IE11 requires that opacity be > 0 for copying.
        image.style.opacity = 0.01;
        var snipSelection = function (x1, y1, x2, y2) {
            var canvas = document.createElement('canvas');
            var context = canvas.getContext('2d');
            var img = new Image( );
            // it's easiest to just use the URL of the original image,
            // though base64 images are an option here as well
            img.src = 'data:image/png;base64,{BASE64 ENCODED IMAGE DATA INCLUDED HERE}';
```

```
        img.onload = function ( ) {
            // this is the size of the area, relative
            // to the original image... we have all these
            // values in the viewer
            var x = Math.min(x1, x2);
            var y = Math.min(y1, y2);
            var width = Math.max(x1, x2) – x;
            var height = Math.max(y1, y2) – y;
            canvas.width = width;
            canvas.height = height;
            // who doesn't love a good function with 9 parameters
            context.drawImage(img, x, y, width, height, 0, 0, width, height);
            var dataURI = canvas.toDataURL('image/png');
            image.src = dataURI;
            // Scale the image to the size of the full resolution SVG clip
            image.width = width;
            image.height = height;
            // Position the raster image over the selected SVG area
            image.style.top = (y * svgHeightRatio) + 'px';
            image.style.left = (x * svgWidthRatio) + 'px';
            // Clip to only the region where the selection rectangle exists
            image.style.clip = 'rect(' + 0 + ' ' + (width * svgWidthRatio) +
'px ' + (height * svgHeightRatio) + 'px ' + '0)';
            selectElem(image);
        };
    };
    function selectElem(elem) {
        var selection = window.getSelection( );
        var range = document.createRange( );
        range.selectNode(elem);
        selection.removeAllRanges( );
        selection.addRange(range);
    }
    function clearSelection( ) {
        // clear the browser selection
        var selection = window.getSelection( );
        selection.removeAllRanges( );
        // clear the selection that we built as well
        selectionBox.setAttribute('fill', 'rgba(0, 0, 0, 0)');
        selectionBox.setAttribute('width', 0);
        selectionBox.setAttribute('height', 0);
        image.src = '';
        image.width = image.height = 0;
        image.style.top = image.style.left = '0px';
    }
    var handleSVGMouseMove = function (e) {
        e.preventDefault( );
        if (selectionMode) {
            // Convert mouse coord to SVG coord
            x2 = e.layerX / svgWidthRatio;
            y2 = e.layerY / svgHeightRatio;
            if (x1 > x2) {
                selectionBox.setAttribute('x', x2);
                selectionBox.setAttribute('width', x1 – x2);
            } else {
                selectionBox.setAttribute('width', x2 – x1);
            }
            if (y1 > y2) {
                selectionBox.setAttribute('y', y2);
                selectionBox.setAttribute('height', y1 – y2);
            } else {
                selectionBox.setAttribute('height', y2 – y1);
            }
        }
    }
    var handleSVGMouseDown = function (e) {
        e.preventDefault( );
        clearSelection( );
        // store the starting x and y coords,
        // converting mouse coord to SVG coord
        x1 = e.layerX / svgWidthRatio;
        y1 = e.layerY / svgHeightRatio;
        selectionMode = true;
        selectionBox.setAttribute('x', x1);
        selectionBox.setAttribute('y', y1);
        selectionBox.setAttribute('width', 0);
        selectionBox.setAttribute('height', 0);
        selectionBox.setAttribute('fill', 'rgba(0, 177, 255, 0.25)');
        svg.addEventListener('mousemove', handleSVGMouseMove);
    }
    var handleSVGMouseUp = function (e) {
        selectionMode = false;
        svg.removeEventListener('mousemove', handleSVGMouseMove);
        snipSelection(x1, y1, x2, y2);
    }
    svg.addEventListener('mousedown', handleSVGMouseDown);
    svg.addEventListener('mouseup', handleSVGMouseUp);
</script>
</body>
</html>
```

In Step 1, the user drags to select an area of the page to copy. In step 2, the selected area is copied by right clicking the selection and choosing "Copy Image" (note: Ctrl+C will not copy the data as an image format onto the clipboard therefore this only works by using the mouse to right click to open the context menu on the selection itself).

Post Selection Page state will now be described.

Figure 7A:
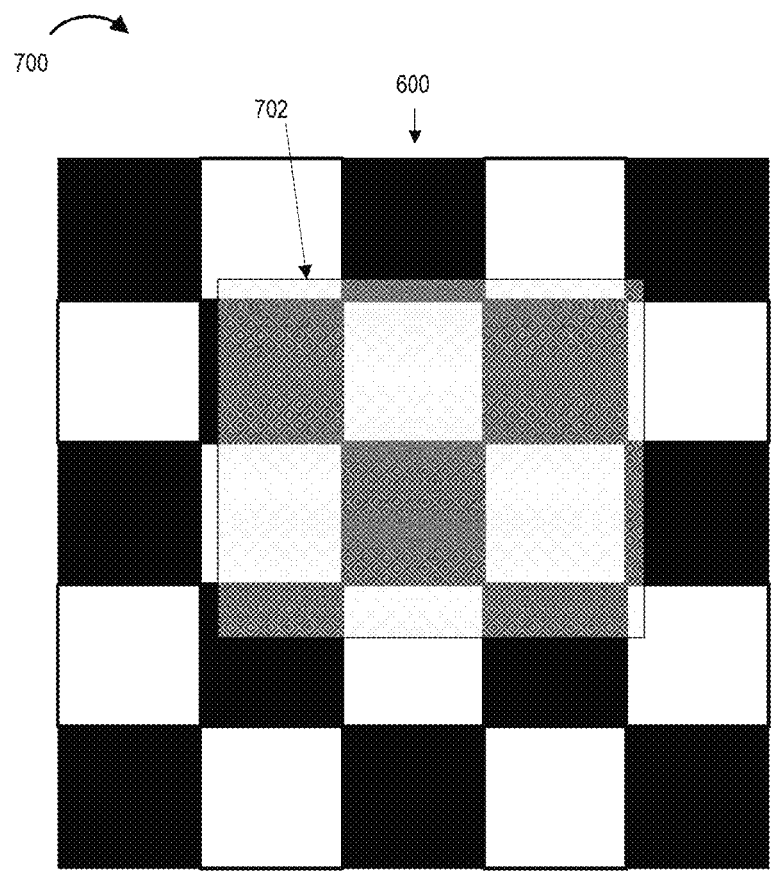
FIG. 7A is a drawing illustrating a user view of the screen display of the web page, e.g., the HTML5 web page after the user has selected an area of the screen.

FIG. 7A is a drawing 700 of a user view of the screen display of the web page, e.g., the HMTL5 web page after the user has selected an area of the screen. In some embodiments, drawing 700 corresponds to both before and after the user has right clicked and selected <<Copy Image>> from the context menu, following user selection of the area of the screen. Drawing 700 includes the original screen view 600 and selected area 702. Note that the added image element (top layer) is effectively invisible to the end user.

The following is exemplary HTML pseudo-code after the selecting and copying.

```
<html lang="en">
<head>
    <meta charset="UTF-8">
    <title>Copy Area</title>
    <style>
        #pageContainer {
            position: relative;
            width: 1000px;
            margin: 0;
            padding: 0;
        }
        svg {
            margin: 0;
            padding: 0;
            width: 100%;
        }
        #image {
            position: absolute;
            opacity: 0.01;
        }
    </style>
</head>
<body>
    <div id="pageContainer" style="position:relative;">
        <svg version="1.1" viewBox="0 0 2000 2000"
xmlns="http://www.w3.org/2000/svg"
xmlns:xlink="http://www.w3.org/1999/xlink"
            height="1000px" width="1000px"
preserveAspectRatio="xMinYMin">
            <image height="2000px" width="2000px"
xlink:href="data:image/png;base64, {BASE64 ENCODED IMAGE
DATA INCLUDED HERE}"
                height="1020" width="1196" style="opacity: 0.01; left:
224px; top: 169px; clip: rect(0px 598px 510px 0px);">
    </div>
    <script>
        var svg = document.querySelector('svg');
        var image = document.querySelector('#image');
        var selectionBox = document.querySelector('rect');
        var svgContent = svg.querySelector('image');
        var x1 = 0;
        var x2 = 0;
```

-continued

```
        var y1 = 0;
        var y2 = 0;
        var selectionMode = false;
        var svgContentRect = svgContent.getBoundingClientRect( );
        var tmp;
        // Calculate the difference in size between the SVG viewbox and the
non-vector elements
        var svgWidthRatio = svgContentRect.width /
svg.getAttribute('viewBox').split(' ')[2];
        var svgHeightRatio = svgContentRect.height /
svg.getAttribute('viewBox').split(' ')[3];
        // Ensure that we cannot see the raster image, which will be very
large.
        // IE11 requires that opacity be > 0 for copying.
        image.style.opacity = 0.01;
        var snipSelection = function (x1, y1, x2, y2) {
            var canvas = document.createElement('canvas');
            var context = canvas.getContext('2d');
            var img = new Image( );
            // it's easiest to just use the URL of the original image,
            // though base64 images are an option here as well
            img.src = 'data:image/png;base64,{BASE64 ENCODED IMAGE
DATA INCLUDED HERE}';
            img.onload = function ( ) {
                // this is the size of the area, relative
                // to the original image... we have all these
                // values in the viewer
                var x = Math.min(x1, x2);
                var y = Math.min(y1, y2);
                var width = Math.max(x1, x2) - x;
                var height = Math.max(y1, y2) - y;
                canvas.width = width;
                canvas.height = height;
                // who doesn't love a good function with 9 parameters
                context.drawImage(img, x, y, width, height, 0, 0, width, height);
                var dataURI = canvas.toDataURL('image/png');
                image.src = dataURI;
                // Scale the image to the size of the full resolution SVG clip
                image.width = width;
                image.height = height;
                // Position the raster image over the selected SVG area
                image.style.top = (y * svgHeightRatio) + 'px';
                image.style.left = (x * svgWidthRatio) + 'px';
                // Clip to only the region where the selection rectangle exists
                image.style.clip = 'rect(' + 0 + ' ' + (width * svgWidthRatio) +
'px ' + (height * svgHeightRatio) + 'px ' + '0)';
                selectElem(image);
            };
        };
        function selectElem(elem) {
            var selection = window.getSelection( );
            var range = document.createRange( );
            range.selectNode(elem);
            selection.removeAllRanges( );
            selection.addRange(range);
        }
        function clearSelection( ) {
            // clear the browser selection
            var selection = window.getSelection( );
            selection.removeAllRanges( );
            // clear the selection that we built as well
            selectionBox.setAttribute('fill', 'rgba(0, 0, 0, 0)');
            selectionBox.setAttribute('width', 0);
            selectionBox.setAttribute('height', 0);
            image.src = '';
            image.width = image.height = 0;
            image.style.top = image.style.left = '0px';
        }
        var handleSVGMouseMove = function (e) {
            e.preventDefault( );
            if (selectionMode) {
                // Convert mouse coord to SVG coord
                x2 = e.layerX / svgWidthRatio;
                y2 = e.layerY / svgHeightRatio;
                if (x1 > x2) {
                    selectionBox.setAttribute('x', x2);
                    selectionBox.setAttribute('width', x1 - x2);
                } else {
                    selectionBox.setAttribute('width', x2 - x1);
                }
            }
            if (y1 > y2) {
                selectionBox.setAttribute('y', y2);
                selectionBox.setAttribute('height', y1 - y2);
            } else {
                selectionBox.setAttribute('height', y2 - y1);
            }
        }
        }
        var handleSVGMouseDown = function (e) {
            e.preventDefault( );
            clearSelection( );
            // store the starting x and y coords,
            // converting mouse coord to SVG coord
            x1 = e.layerX / svgWidthRatio;
            y1 = e.layerY / svgHeightRatio;
            selectionMode = true;
            selectionBox.setAttribute('x', x1);
            selectionBox.setAttribute('y', y1);
            selectionBox.setAttribute('width', 0);
            selectionBox.setAttribute('height', 0);
            selectionBox.setAttribute('fill', 'rgba(0, 177, 255, 0.25)');
            svg.addEventListener('mousemove', handleSVGMouseMove);
        }
        var handleSVGMouseUp = function (e) {
            selectionMode = false;
            svg.removeEventListener('mousemove', handleSVGMouseMove);
            snipSelection(x1, y1, x2, y2);
        }
        svg.addEventListener('mousedown', handleSVGMouseDown);
        svg.addEventListener('mouseup', handleSVGMouseUp);
    </script>
</body>
</html>
```

NOTE: Areas of HTML code that are altered (between the pre-selection page state and the post selection page state) with this invention are noted by the use of the bold print.

Figure 7B:
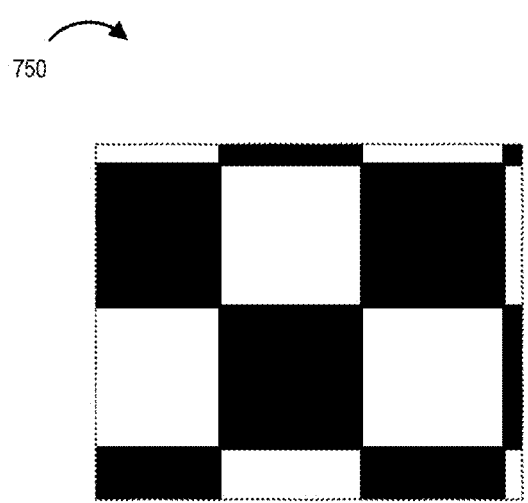
FIG. 7B is a drawing illustrating an image of an exemplary image element stored on a computer clipboard, e.g., after the user selected an area of a displayed HTML5 web page and right clicked and selected <<Copy Image>> from the context menu.

FIG. 7B is a drawing illustrating an image 750 of an exemplary image element stored on a computer clipboard, e.g., after the user selected an area of a displayed HTML5 web page and right clicked and selected <<Copy Image>> from the context menu. The dashed line bordering the image 750 of the image element is not part of the image element, but is included to show the outline of the image element. The displayed image 750 of FIG. 7B of the exemplary image element stored on the computer clipboard is a non-transparent image of the stored image element, which may be displayed, e.g., as part of using a second application, by the display device, e.g., display device 202 of FIG. 2, or communicated, e.g., as part of using a second application, to another device, e.g. e-mail server 814, additional application server 1 816 or additional application server n 818 of FIG. 8.

Figure 8:
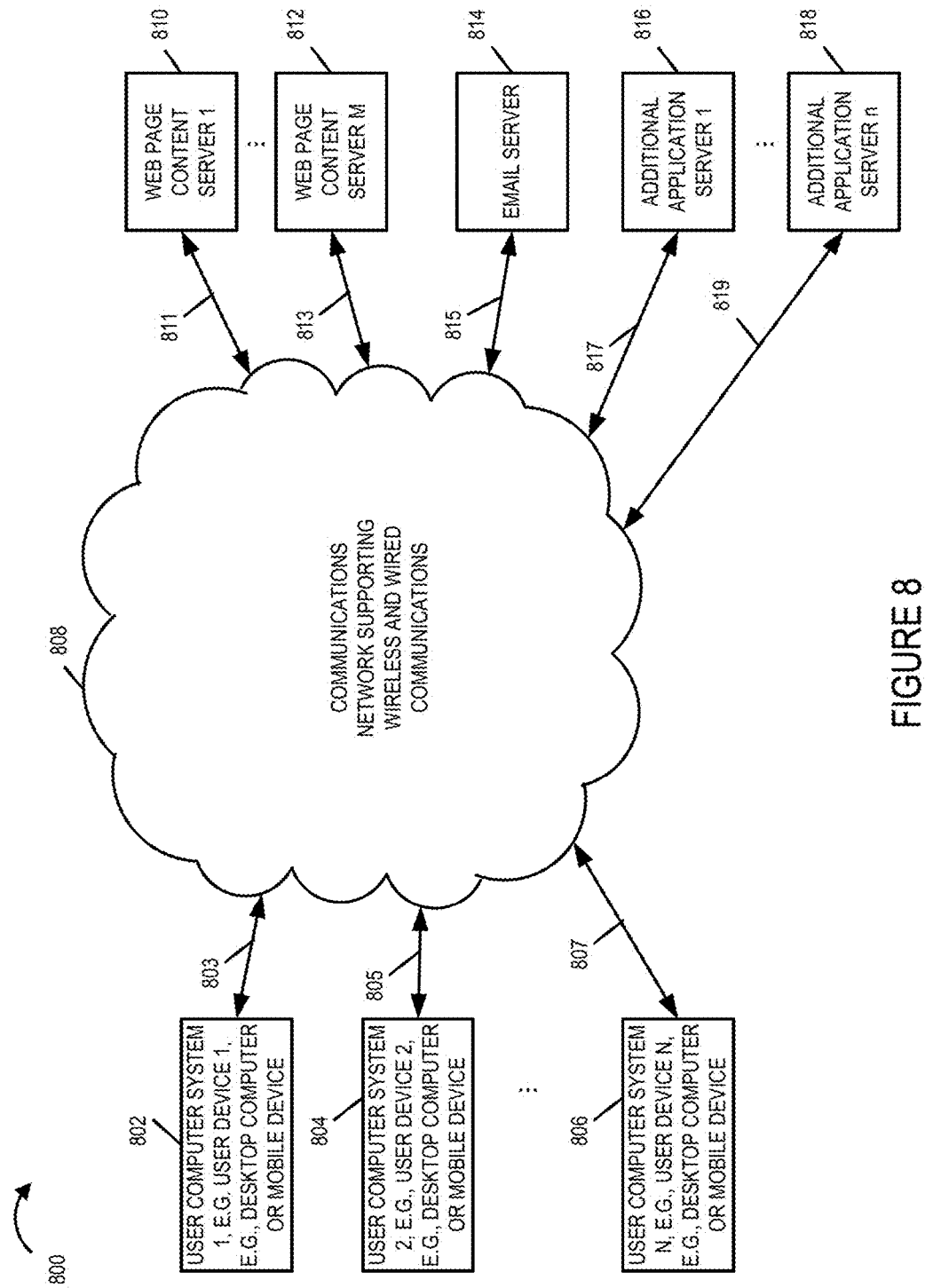
FIG. 8 is a drawing of an exemplary communications system in accordance with an exemplary embodiment.

FIG. 8 is a drawing of an exemplary communications system 800 in accordance with an exemplary embodiment. Exemplary communications system 800 includes a plurality of user computer systems (user computer system 1 802, user computer system 2 804, . . . , user computer system N 806), a communications network 808 supporting wireless and wired communications. A user computer system (802, 804, . . . 806) may be, and sometimes is, a computer device, e.g., a desktop computer or a mobile device. Communications system 800 further includes a plurality of web page servers (web page server 1 810, . . . , web page server M 812, an e-mail server 814, and a plurality of additional application servers (additional application server 1 816, . . . , additional application server n 818). An additional application server may, e.g., support a paint application. Each of the devices (802, 804, 806, 810, 812, 814, 818) are coupled to the communications network 808 via a communications link (803, 805, 807, 811, 813, 815, 819), respectively. The communications network 808 includes, e.g., base stations, access points, routers, an AAA server, core network elements, and communications links. Each of the communications links (803, 805, 807, 811, 813, 815, 819) may be a wired communications link, e.g., coaxial cable link, wired Ethernet link, optical cable link, etc., or a wireless communications link, e.g., a wireless cellular link, a WiFi link, etc. Each of the user devices (802, 804, . . . , 808) is, e.g., a desktop computer or a mobile communications device, e.g., a laptop computer, smartphone, computer tablet, computer pad, etc. Each of the user devices (802, 804, . . . , 806) includes one or more web browsers. The user devices (user device 1 802, user device 804, . . . , user device N 808) implement methods in accordance with the present invention, e.g., implement the method of flowchart 100 of FIG. 1. The user computer systems (user computer system 1 802, user computer system 804, . . . , user computer system N 806) may be, and sometimes, are implemented in accordance with computer system 200, e.g., a device, of FIG. 2 and/or include assembly of components 300 of FIG. 3 and/or include memory 400 of FIG. 4.

Numbered List of Exemplary Method Embodiments:

Method Embodiment 1 A method of operating a computer system to copy content, the method comprising: determining (114) from user input, a user selected area of a displayed web page; creating (120) an image element corresponding to the position of the user selected area; updating (134) the displayed web page image to include the image element as a transparent overlay; signaling (136) to a web browser controlling the display of said web page that the added image element has been selected by the user; and copying (142) image element to a computer clipboard.

Method Embodiment 2 The method of Method Embodiment 1, further comprising: communicating an image (146) of the image element to another device, said image being a non-transparent image.

Method Embodiment 3 The method of Method Embodiment 2, further comprising, prior to determining the user selected area: loading (108) an web page into memory; displaying (110) an image of the web page on a display device, said displayed image being the displayed web page; and detecting (112) user selection of an enable copy tool with which the user can select a portion of the displayed web page.

Method Embodiment 4 The method of Method Embodiment 3, wherein said web page is an HTML5 web page.

Method Embodiment 5 The method of Method Embodiment 3, further comprising: generating a raster data URL (116) for the user selected area; and wherein creating (120) an image element includes setting an SRC attribute of the image element to the raster data URL generated for the user selected area.

Method Embodiment 6 The method of Method Embodiment 5, wherein creating (120) an image element includes: including (122) in said image element an ABSOLUTE property indicator so that the image element does not interact with the layout of any existing elements on said web page.

Method Embodiment 7 The method of Method Embodiment 6, wherein creating (120) an image element includes: setting (124) an image element opacity value to a non-zero value which will result in the image element being transparent and imperceptible to a human viewer (e.g., not detectable by a human eye) when the image element is added to the web page.

Method Embodiment 8 The method of Method Embodiment 7, wherein said non-zero value is a value less than 0.05 and greater than 0.

Method Embodiment 9 The method of Method Embodiment 7, wherein creating (120) an image element further includes: setting (128) an image element Z-index included in said image element to a Z-index value greater than content in said web page so that the generated image element will be a top layer when the image element is added to the web page.

Method Embodiment 10 The method of Method Embodiment 9, wherein creating (120) an image element further includes: creating (126) a clip property having the same dimensions as the user selected area so that when the image element is copied to the clip board the copied image will be the same size as the user selected web page portion; and including (127) the clip property in the image element.

Method Embodiment 11 The method of Method Embodiment 10, wherein creating a clip property includes generated an SVG1.1 RECT Element having the same dimensions as the user selected area of the web page portion.

Method Embodiment 12 The method of Method Embodiment 10, further comprising: adding (132) the image element to the web page in memory prior to updating (134) the displayed web page image to include the image element as a transparent overlay, said updating of the displayed web page image reflecting the addition of the image element to the web page in memory.

Method Embodiment 13 The method of Method Embodiment 12, wherein said step of signaling (136) to a web browser controlling the display of said web page that the added image element has been selected by the user is performed automatically by the processor without further user input after the user provides the input used to indicate the selected web page area following detection (112) of selection of an enable copy tool by the user. (E.g., once the user enables the copy function by selection of enable copy tool by clicking on a copy tool icon, the user can select the area to be copied using a mouse click combined with mouse movement to indicate the user selected area or by using a touch screen input to indicate the user selected area to be copied.)

Numbered List of Exemplary System Embodiments:

System Embodiment 1 A computer system comprising: a processor configured to: determine from user input, a user selected area of a displayed web page; create an image element corresponding to the position of the user selected area; update the displayed web page image to include the image element as a transparent overlay; signal to a web browser controlling the display of said web page that the added image element has been selected by the user; and copy the image element to a computer clipboard.

System Embodiment 2 The computer system of System Embodiment 1, wherein said processor is further configured to: communicate an image of the image element to another device, said image being a non-transparent image.

System Embodiment 3 The computer system of System Embodiment 2, wherein said processor is further configured to: load a web page into memory; display an image of the web page on a display device, said displayed image being the displayed web page; and detect user selection of an enable copy tool with which the user can select a portion of the displayed web page, and wherein said loading, displaying and detecting are performed prior to said step of determining the user selected area.

System Embodiment 4 The computer system of System Embodiment 3, wherein said web page is an HTML5 web page.

System Embodiment 5 The computer system of System Embodiment 3, wherein said processor is further configured to: generate a raster data URL for the user selected area; and wherein said processor is configured to set an SRC attribute of the image element to the raster data URL generated for the user selected area, as part of being configured to create an image element.

System Embodiment 6 The computer system of System Embodiment 5, wherein said processor is configured to include in said image element an ABSOLUTE property indicator so that the image element does not interact with the layout of any existing elements on said web page, as part of being configured to create an image element.

System Embodiment 7 The computer system of System Embodiment 6, wherein said processor is configured to set an image element opacity value to a non-zero value which will result in the image element being transparent and imperceptible to a human viewer when the image element is added to the web page, as part of being configured to create an image element.

System Embodiment 8 The computer system of System Embodiment 7, wherein said non-zero value is a value less than 0.05 and greater than 0.

System Embodiment 9 The computer system of System Embodiment 7, wherein said processor is configured to set an image element Z-index included in said image element to a Z-index value greater than content in said web page so that the generated image element will be a top layer when the image element is added to the web page, as part of being configured to create an image element.

System Embodiment 10 The computer system of System Embodiment 9, wherein said processor is configured to: create a clip property having the same dimensions as the user selected area so that when the image element is copied to the clip board the copied image will be the same size as the user selected web page portion; and include the clip property in the image element, as part of being configured to create an image element.

System Embodiment 11 The computer system of System Embodiment 10, wherein said processor is configured to include a generated an SVG1.1 RECT Element having the same dimensions as the user selected area of the web page portion, as part of being configured to create a clip property.

System Embodiment 12 The computer system of System Embodiment 10, wherein said processor is further configured to: add the image element to the web page in memory prior to updating the displayed web page image to include the image element as a transparent overlay, said updating of the displayed web page image reflecting the addition of the image element to the web page in memory.

System Embodiment 13 The computer system of System Embodiment 12, wherein said processor is configured to perform said step of signaling to a web browser controlling the display of said web page that the added image element has been selected by the user is performed automatically without further user input after the user provides the input used to indicate the selected web page area following detection of selection of an enable copy tool by the user.

The techniques of various embodiments may be implemented using software, hardware and/or a combination of software and hardware. Various embodiments are directed to apparatus, e.g., an image processing device or system. Various embodiments are also directed to methods, e.g., a method of extracting, e.g., copying to a clipboard, and using data/information from a user selected area of a displayed web page. Various embodiments are also directed to machine, e.g., computer, readable medium, e.g., ROM, RAM, CDs, hard disks, etc., which include machine readable instructions for controlling a machine to implement one or more steps of a method.

In various embodiments apparatus described herein are implemented using one or more components to perform the steps corresponding to one or more methods. Thus, in some embodiments various features are implemented using components. Such components may be implemented using software, hardware or a combination of software and hardware. In some embodiments in which the components are implemented in hardware, the components are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s). Each of the steps of the method may be, and sometimes, are implemented by a circuit with different circuits being used for each of the different steps in some but not all embodiments.

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments, the image processing device is a desktop computer. In some embodiments the image processing device is a portable device, e.g., a laptop computer, handheld computer, tablet computer, smart phone, personal data assistant, etc., with a processor that implements the method.

In some embodiments components are implemented using software, in other embodiments components are implemented in hardware, in still other embodiments the components are implemented using a combination of hardware and/or software.

Numerous additional variations on the methods and apparatus of the various embodiments described above will be apparent to those skilled in the art in view of the above description. Such variations are to be considered within the scope of the invention.

What is claimed:

1. A method of operating a computer system to copy content, the method comprising:
   determining from user input, a user selected area of a displayed web page, said displayed web page including initial web page content;
   creating an image element corresponding to the position of the user selected area, said image element including a duplicate of elements in the user selected area but in a format that overcomes web browser security restrictions and allows copying to a computer clipboard;
   updating the displayed web page image to include the image element as a transparent overlay, said updating adding the image element to the displayed web page so that the displayed web page includes the image element in addition to said initial web page content following said updating;

signaling to a web browser controlling the display of said web page that the image element that was added to the web page has been selected by the user; and copying image element to the computer clipboard.

2. The method of claim 1, further comprising:
communicating an image of the image element to another device, said image being a non-transparent image.

3. The method of claim 2, further comprising, prior to determining the user selected area:
loading an web page into memory;
displaying an image of the web page on a display device, said displayed image being the displayed web page; and
detecting user selection of an enable copy tool with which the user can select a portion of the displayed web page.

4. The method of claim 3, further comprising:
generating a raster data URL for the user selected area; and
wherein creating an image element includes setting an SRC attribute of the image element to the raster data URL generated for the user selected area.

5. The method of claim 4, wherein creating an image element includes:
including in said image element an indicator or value that ensures that the image element does not interact or affect the layout of other elements already on said web page.

6. The method of claim 5, wherein creating an image element includes:
setting an image element opacity value to a non-zero value which will result in the image element being transparent and imperceptible to a human viewer when the image element is added to the web page.

7. The method of claim 6, wherein said non-zero value is a value less than 0.05 and greater than 0.

8. The method of claim 6, wherein creating an image element further includes:
setting an image element Z-index included in said image element to a Z-index value greater than content in said web page so that the generated image element will be a top layer when the image element is added to the web page;
creating a clip property having the same dimensions as the user selected area so that when the image element is copied to the clip board the copied image will be the same size as the user selected web page portion; and
including the clip property in the image element.

9. The method of claim 8, further comprising:
adding the image element to the web page in memory prior to updating the displayed web page image to include the image element as a transparent overlay, said updating of the displayed web page image reflecting the addition of the image element to the web page in memory.

10. The method of claim 9, wherein said step of signaling to a web browser controlling the display of said web page that the added image element has been selected by the user is performed automatically by a processor without further user input after the user provides the input used to indicate the selected web page area following detection of selection of an enable copy tool by the user.

11. The method of claim 1, wherein said web page is an HTML5 web page.

12. The method of claim 1, wherein the image element is imperceptible to a human viewer.

13. A computer system comprising:
a processor configured to:
determine from user input, a user selected area of a displayed web page, said displayed web page including initial web page content;
create an image element corresponding to the position of the user selected area, said image element including a duplicate of elements in the user selected area but in a format that overcomes web browser security restrictions and allows copying to a computer clipboard;
update the displayed web page image to include the image element as a transparent overlay, said updating adding the image element to the displayed web page so that the displayed web page includes the image element in addition to said initial web page content following said updating;
signal to a web browser controlling the display of said web page that the added image element has been selected by the user; and
copy the image element that was added to the web page to the computer clipboard.

14. The computer system of claim 13, wherein said processor is further configured to:
communicate an image of the image element to another device, said image being a non-transparent image.

15. The computer system of claim 14, wherein said processor is further configured to:
load a web page into memory;
display an image of the web page on a display device, said displayed image being the displayed web page; and
detect user selection of an enable copy tool with which the user can select a portion of the displayed web page, and
wherein said loading, displaying and detecting are performed prior to said step of determining the user selected area.

16. The computer system of claim 15, wherein said processor is further configured to:
generate a raster data URL for the user selected area; and
wherein said processor is configured to set an SRC attribute of the image element to the raster data URL generated for the user selected area, as part of being configured to create an image element.

17. The computer system of claim 16,
wherein said processor is configured to include in said image element an indicator or value that ensures that the image element does not interact or affect the layout of other elements already on said web page; and
wherein said processor is further configured to set an image element opacity value to a non-zero value which will result in the image element being transparent and imperceptible to a human viewer when the image element is added to the web page, as part of being configured to create an image element.

18. The computer system of claim 13, wherein the image element is imperceptible to a human viewer.

19. A non-transitory computer readable medium, comprising processor executable instructions which when executed by a processor control the processor to:
determine from user input, a user selected area of a displayed web page, said displayed web page including initial web page content;
create an image element corresponding to the position of the user selected area, said image element including a duplicate of elements in the user selected area but in a format that overcomes web browser security restrictions and allows copying to a computer clipboard;

update the displayed web page image to include the image element as a transparent overlay, said updating adding the image element to the displayed web page so that the displayed web page includes the image element in addition to said initial web page content following said updating;

signal to a web browser controlling the display of said web page that the added image element has been selected by the user; and copy the image element that was added to the web page to the computer clipboard.

\* \* \* \* \*